Nov. 6, 1928.

F. T. COPE 1,690,273

ELECTRIC FURNACE

Original Filed Nov. 9, 1925  2 Sheets-Sheet 2

Inventor

Frank T. Cope

By Frease and Bond

Attorneys

Patented Nov. 6, 1928.

1,690,273

UNITED STATES PATENT OFFICE.

FRANK T. COPE, OF SALEM, OHIO, ASSIGNOR TO THE ELECTRIC FURNACE COMPANY, OF SALEM, OHIO, A CORPORATION OF OHIO.

ELECTRIC FURNACE.

Original application filed November 9, 1925. Serial No. 67,810. Divided and this application filed January 12, 1927. Serial No. 160,634.

The invention relates to that class of furnaces in which the heat is derived from resistor grids, and more particularly to furnaces of this general type in which resistor grids are located in the floor and roof of the furnace in order to give up heat to the top and bottom portions of the material to be treated. This application is a division of my copending application Serial No. 67,810 filed November 9, 1925, and the present application pertains more particularly to the construction and mounting of the resistor grids upon the roof of the furnace.

A common objection to furnaces of this type is that the resistors, by means of which heat is liberated, have heretofore been made of a drawn or rolled wire or ribbon having comparatively small cross-section and consequently low mechanical strength, the result being that when such a resistor is used insulating spacers are required for the purpose of preventing contact between adjacent strands of the resistor due to deformation of the same when heated.

The object of the present improvement is to provide a furnace having rigid resistors, which may be of structural shape and preferably cast of heat resisting metal, in the roof and beneath the working hearth of the furnace; and to provide novel means for supporting the roof resistor grids.

Experience has shown that with such a construction of rigid resistor grids insulating spacers or separators between adjacent strands of the grid are unnecessary because the grid has sufficient rigidity and mechanical strength at high temperatures to prevent distortion and consequent short circuiting of the resistors, thus eliminating the insulating separators which are a very fragile and expensive part.

Figure 1:
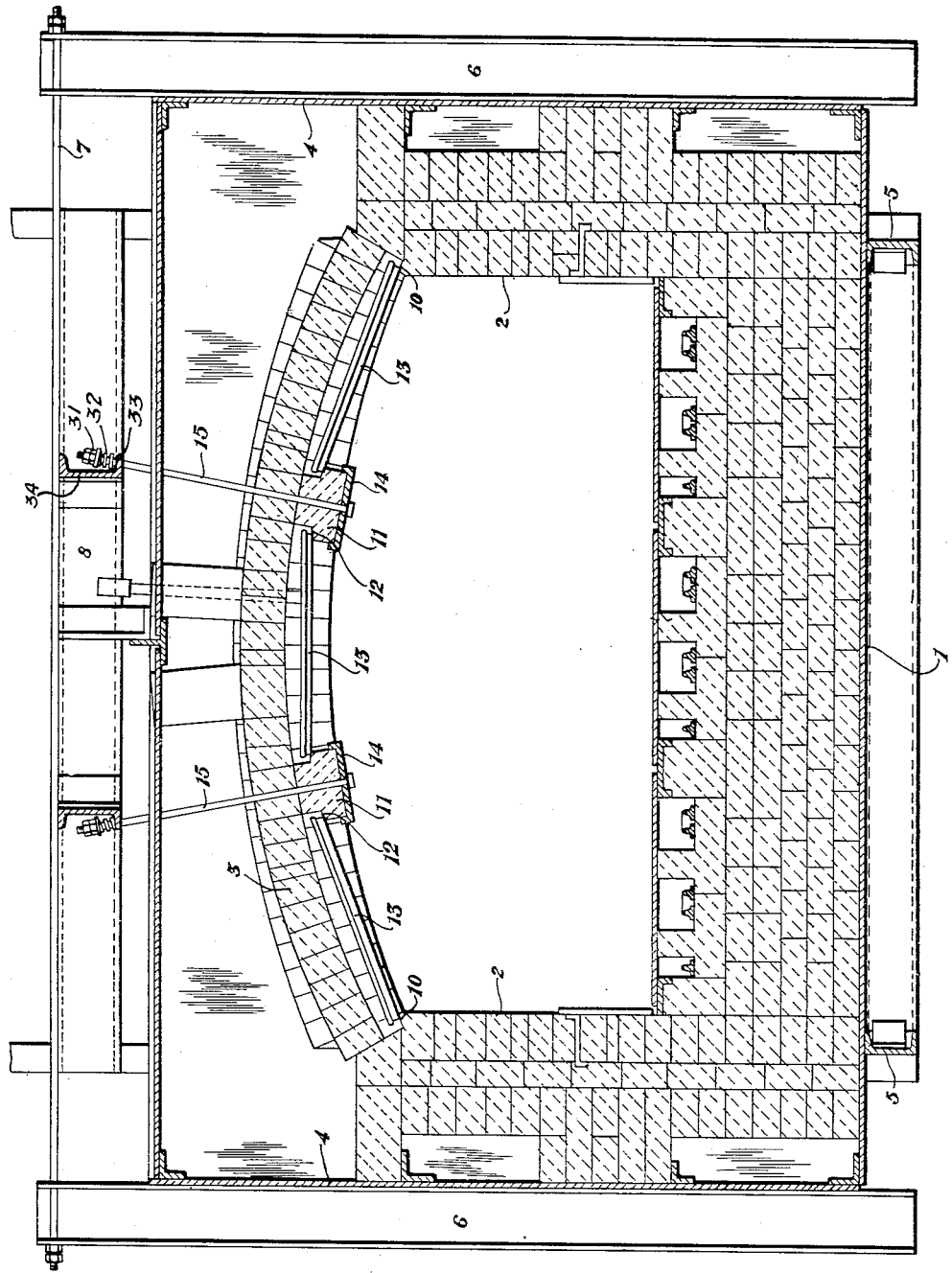
Figure 2:
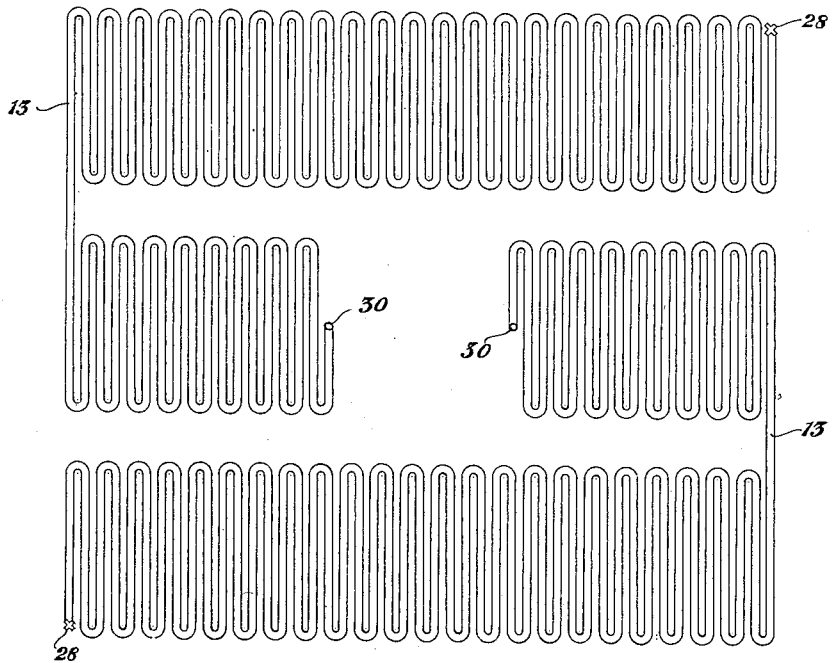

An embodiment of the invention is illustrated in the accompanying drawings, in which Figure 1 is a transverse sectional view of the improved furnace;

Fig. 2, a plan view of the roof grids, and

Figure 3:
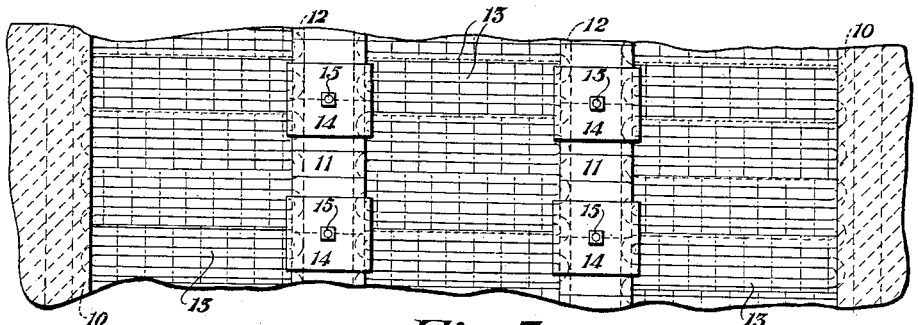

Fig. 3, a bottom plan view of the roof of the furnace.

Similar numerals refer to similar parts throughout the drawings.

The improved furnace may comprise the bottom or base 1, side walls 2 and the roof 3, formed of suitable brickwork and enclosed as by the metal casing 4. This brickwork may be supported upon the horizontal structural members 5, and reinforced by the vertical structural members 6, connected at their upper ends as by the tie bolts 7, and carrying the roof supporting structure 8.

For the purpose of supporting resistor grids in the roof of the furnace, a ledge 10 is formed at each side edge of the roof, and blocks 11, located at spaced intervals across the span of the roof, are provided with ledges 12 for supporting the end portions of the resistor grids 13.

Each of these blocks 11 may be removable and is preferably reinforced upon its under side with a metal channel 14, and a bolt 15 may be located through the same and suspended from the roof structure 8.

Each of the grids 13 may be of structural shape, and is preferably a casting, and may consist of a plurality of straight parallel portions connected together at alternate ends, producing a continuous resistor. Each of these grids may be placed in position by supporting the same between the ledges 10 and 12, the end portions of the grids resting thereon.

The opposite ends of the lower grid may be electrically connected to the outer ends 28 of the upper grids, while the inner ends 30 thereof may be connected to opposite sides of a circuit whereby the upper and lower grids are located in the same circuit.

From the above description and an inspection of the accompanying drawings it will be evident that a novel construction and arrangement of roof grids is provided, the grids being self-sustained and supported only at their ends upon the ledges provided in the roof, no intermediate supports or spacers being necessary.

It will also be obvious that this construction of roof grid support does not necessitate the tearing down or material dismantling of the furnace in order to remove the grids, as the grids are not withdrawn horizontally from their supports. The detachable supporting ledges or blocks may be removed at any desired point of the roof, permitting the necessary sections of the grid to be lowered.

Nuts 31 are attached to the upper end of the bolts 15 to the roof superstructure 8. Springs 32 may be interposed between the nuts 31 and the flange 33 of the channel 34 which forms a part of the roof supporting structure 8, in order to compensate for expansion and contraction of the bolt 15 due to heating and cooling of the furnace. The weight of the blocks 11 and of the grids 13 supported by the blocks 11 is thereby supported independently of the roof 3 and carried entirely by the roof supporting superstructure 8.

I claim:

1. An electric furnace including a refractory roof, spaced independently detachable blocks having ledges upon the under side of the roof supported independently of the roof and rigid resistor grids supported at their end portions only upon said ledges.

2. An electric furnace including a refractory roof, spaced independently detachable blocks upon the underside of the roof supported independently of the roof having ledges protruding below the roof and rigid resistor grids supported at their end portions only upon said ledges.

3. An electric furnace including a refractory roof, spaced blocks independently detachably suspended independently of the roof and having ledges thereon, and a rigid resistor grid supported at both end portions only upon said ledges.

4. An electric furnace including a refractory roof, spaced refractory blocks beneath the roof supported independently of the roof, metal reinforcing plates upon the under sides of the blocks, and a rigid resistor grid supported at both ends upon said blocks.

5. An electric furnace including a refractory roof, a superstructure above the roof, spaced blocks suspended from the superstructure and located beneath the roof, and a rigid resistor grid supported at its end portions upon said blocks.

6. An electric furnace including a refractory roof, spaced blocks suspended beneath the roof, supporting bolts located through said blocks and entirely through the roof and supported independently of the roof, and a rigid resistor grid supported at its end portions upon said blocks.

7. An electric furnace including a refractory roof, a block detachably suspended beneath the roof, a supporting bolt located through said block and through the roof and supported independently of the roof, and a rigid resistor grid supported at one end upon said block.

In testimony that I claim the above, I have hereunto subscribed my name.

FRANK T. COPE.